United States Patent
Oshidari (12)

(10) Patent No.: US 6,461,270 B2
(45) Date of Patent: Oct. 8, 2002

(54) TOROIDAL CONTINUOUSLY VARIABLE TRANSMISSION

(75) Inventor: Toshikazu Oshidari, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/746,510

(22) Filed: Dec. 26, 2000

(65) Prior Publication Data

US 2001/0016534 A1 Aug. 23, 2001

(30) Foreign Application Priority Data

Dec. 28, 1999 (JP) .......................................... 11-372451

(51) Int. Cl.[7] .............................................. F16H 15/38
(52) U.S. Cl. ........................................... 476/42; 476/40
(58) Field of Search ............................... 476/10, 40, 42

(56) References Cited

U.S. PATENT DOCUMENTS 5,033,322 A * 7/1991 Nakano ....................... 476/10
5,885,185 A * 3/1999 Kidokoro et al. ............. 476/10
5,893,815 A   4/1999 Nakano ....................... 476/42
5,902,208 A   5/1999 Nakano ....................... 476/42

FOREIGN PATENT DOCUMENTS

| JP | 9-317837 | 12/1997 |
| JP | 11-294550 | * 10/1999 |

* cited by examiner

Primary Examiner—Allan D. Herrmann
(74) Attorney, Agent, or Firm—Foley & Lardner

(57) ABSTRACT

A pair of power rollers which is gripped between an input disk and an output disk and transmits torque by friction, is supported rotatably by a pair of trunnions. The upper ends and lower ends of the trunnions are respectively connected by links, and the power roller is prevented from being driven out from between the input disk and output disk by the grip force. When the trunnions and the power rollers are displaced by the servopistons in the trunnion axis direction in mutually opposite directions, the trunnions and power rollers gyrate around the trunnion axis as pivot, and a speed change will occur. Links are provided with slots which lengthen in the trunnion axis direction, and are supported in the transmission case free to displace in the trunnion axis direction via pins inserted in the slots.

9 Claims, 7 Drawing Sheets

TOROIDAL CONTINUOUSLY VARIABLE TRANSMISSION

FIELD OF THE INVENTION

The present invention relates to a toroidal continuously variable transmission.

BACKGROUND OF THE INVENTION

In a toroidal continuously variable transmission (hereafter, CVT), an input disk and output disk arranged face to face grip a pair of power rollers. The power rollers gripped therebetween transfer a torque from the input disk to the output disk by friction. The power rollers are supported rotatably by trunnions.

If the trunnions displace in the trunnion axis direction in mutually opposite directions, the power rollers gyrate with the trunnions, and as a result, the contact circle radius with one of the input disk and output disk increases, while the other contact circle radius decreases. The variation of these contact circle radii causes a variation of the rotation speed ratio of the input disk and output disk, i.e., a speed ratio. Thus, the speed ratio of the transmission can be varied continuously by displacing the trunnion in the trunnion axis direction. The rotation angle about the trunnion axis as pivot is referred to as the power roller gyration angle, and directly corresponds to the speed ratio of the CVT.

Here, the pair of power rollers are gripped between the input disk and output disk by a thrust force generated by a loading mechanism. Due to the force, the pair of power rollers tend to displace in a direction separating them, and the pair of trunnions which support the power rollers also tend to displace in a direction separating the trunnions. To prevent this displacement, the upper ends and lower ends of the trunnions are connected by an upper link and lower link, respectively. During speed change, the trunnions displace in mutually opposite directions along the trunnion axis, and also gyrate around the trunnion axis as pivot. The trunnions are joined to these links via combination joints which combine a bearing and a spherical joint.

In general, the links are supported in the transmission so that they are only rotatable around pins as pivots, as disclosed by JP-A-H9-317837 published by the Japanese Patent Office in 1997.

SUMMARY OF THE INVENTION

During speed change, the trunnions displace in mutually opposite directions in the trunnion axis direction as above-mentioned. However, in the structure wherein the links are supported via the pins, if the trunnions and links interfere, the pins function as a pivot so that a force in the same direction acts on the trunnions.

For example, if one trunnion pushes a link from the bottom, this trunnion receives a downward force from the link, and a downward force will also act on the other trunnion with the pin as a pivot. Consequently, the synchronism of the trunnions is disturbed and they do not displace in mutually opposite directions correctly.

If they do not displace in synchronism, the forces acting on the power rollers from the disks are not equal, and if one of the forces becomes large, the power roller on which the large force acts may slip between the disks.

To suppress this slip, the force with which the disks grip the power rollers must be increased, but to increase the grip force, a loading cam which generates a large thrust force is required, and the strength of various parts must be increased to withstand this grip force. This tends to increase the size of the transmission.

It is therefore an object of this invention to prevent links from exerting forces in the same direction on ions even if the trunnions and links interfere with each other.

It is a further object of this invention to prevent links from interfering with components other than trunnions.

In order to achieve the above objects the present invention provides a toroidal continuously variable transmission, comprising an input disk, an output disk facing the input disk, power rollers gripped between the input disk and output disk, trunnions which support the power rollers rotatably, and a link jointed to the trunnions, which limits the displacement of the trunnions in the power roller rotation axis direction, and is supported free to displace in the trunnion axis direction in a transmission case.

The details as well as other features and advantages of this invention are set forth in the remainder of the specification and are shown in the accompanying drawings.

DESCRIPTION OF THE PREFERRED EMBODIMENTS

Figure 1:
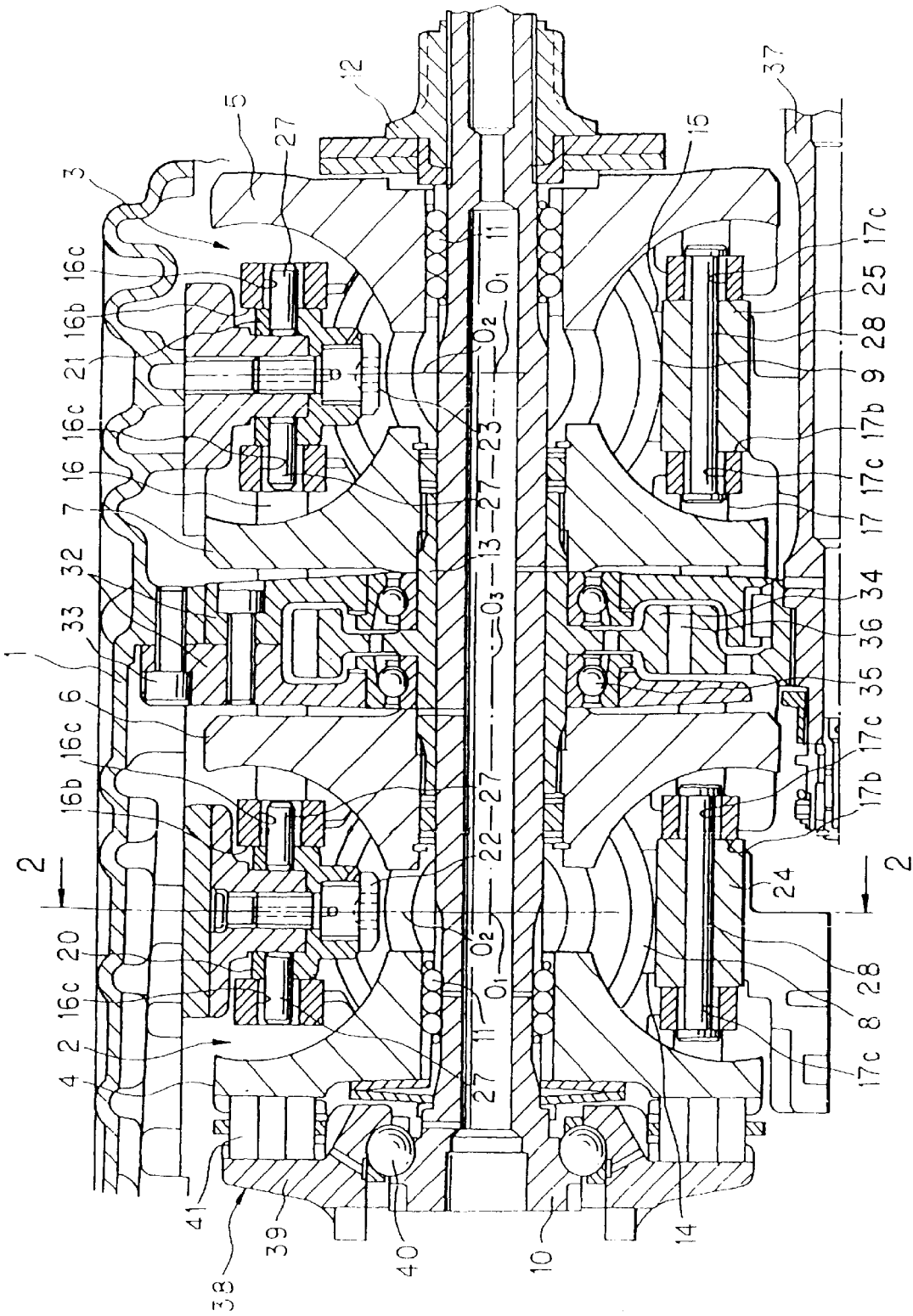
FIG. 1 is a longitudinal sectional view of a toroidal continuously variable transmission according to this invention.

Referring to FIG. 1 of the drawings, to increase the torque which a transmission can transfer, a toroidal continuously variable transmission (hereafter, CVT) relating to this invention is a double cavity type which has a front toroidal speed change mechanism 2 and rear toroidal speed change mechanism 3 coaxially in a transmission case 1.

Figure 2:
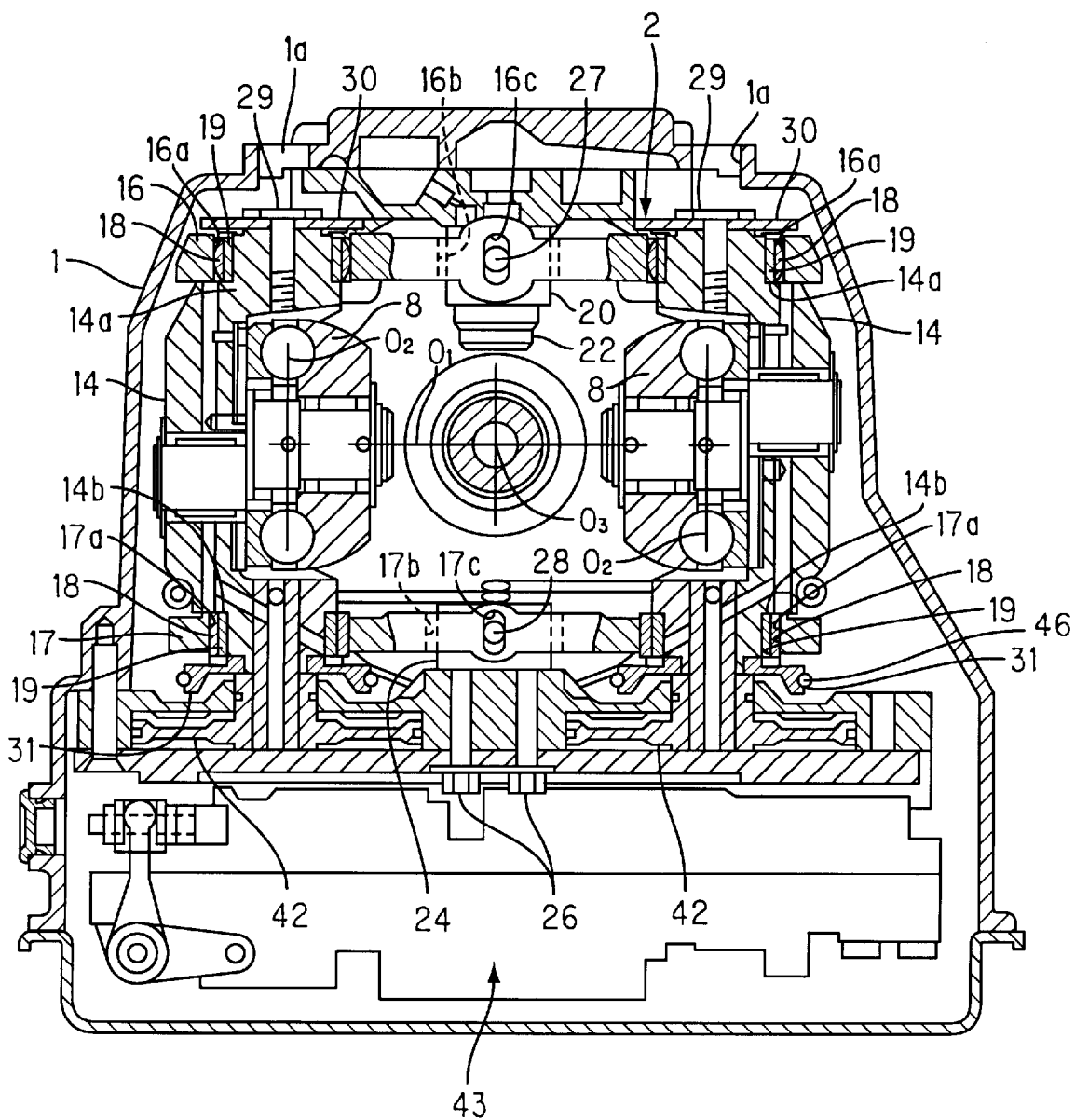
FIG. 2 is a sectional view taken through a line 2—2 of FIG. 1.

The toroidal speed change mechanisms 2, 3 are equipped with power rollers 8, 9 gripped between input disks 4, 5 and output disks 6, 7 facing each other. The power roller 8 of the front toroidal speed change mechanism 2 is gripped between these disks so that the torque is transferred from the input disk to the output disk by friction, as shown in FIG. 2. The power roller 8 is arranged on both sides of the rotation shaft $O_3$ of the input/output disks, and likewise for the power roller 9 of the rear toroidal speed change mechanism 3.

The front toroidal speed change mechanism 2 and rear toroidal speed change mechanism 3 are arranged coaxially with the rear sides of the output disks 6, 7 facing each other, as shown in FIG. 1. In the transmission case 1, a main shaft 10 is supported rotatably, and the input/output disks 4–7 are supported by the main shaft 10. The input disks 4, 5 are respectively supported by the main shaft 10 to slide in the shaft direction by a ball spline 11. A nut 12 is screwed into the main shaft 10 so that the rear input disk 5 does not fall out.

The output disks 6, 7 are linked via a hollow output shaft 13. The hollow output shaft 13 is supported rotatably on the main shaft 10.

The power rollers 8, 9 are respectively arranged between the input disk 4 and output disk 6, and between the input disk 5 and output disk 7. The power rollers 8, 9 are supported rotatable by trunnions 14, 15. FIG. 2 shows the trunnions 14 which support the power rollers 8 of the front toroidal speed change mechanism 2 rotatably, and the shape of the trunnions 15 which support the power rollers 9 of the rear toroidal speed change mechanism 3 is identical.

Figure 3:
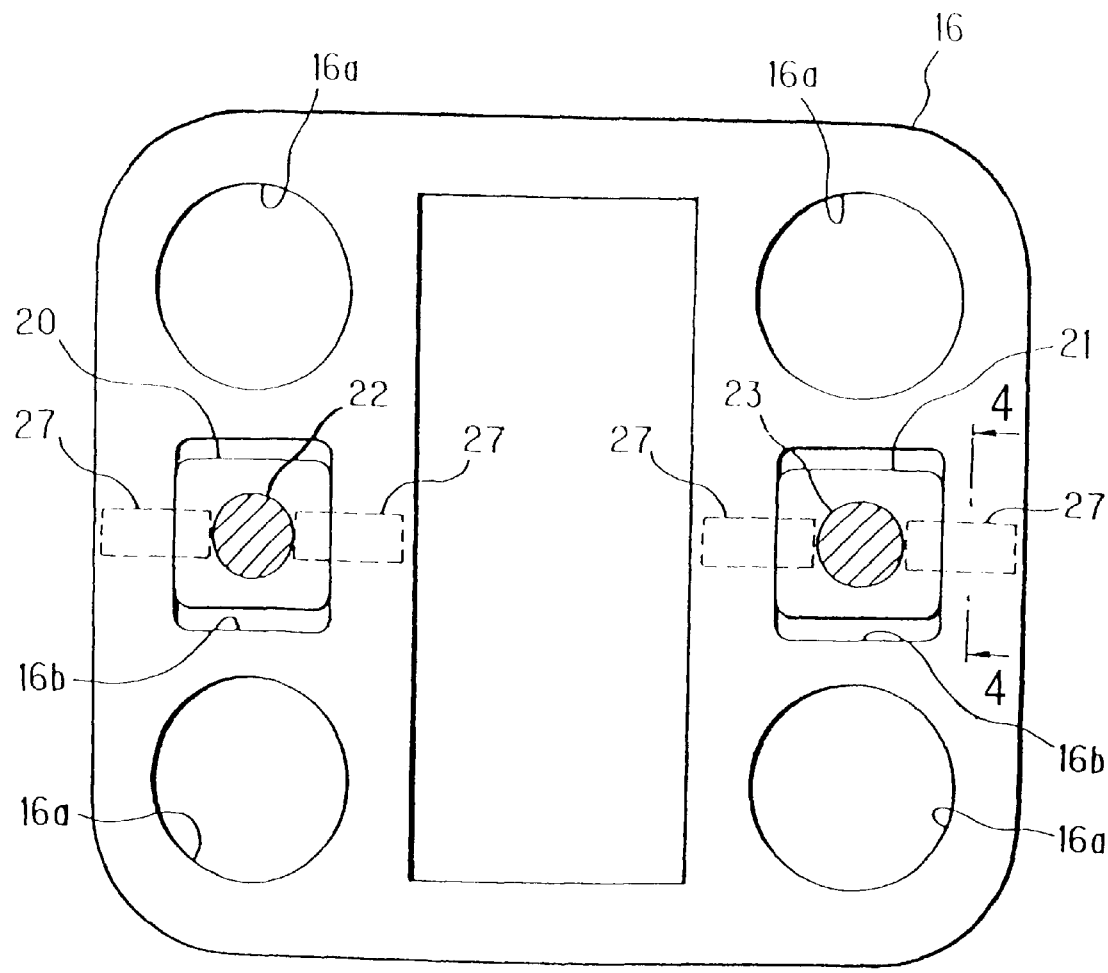
FIG. 3 is a plan view of an upper link of the transmission of FIG. 3.

The upper ends of the trunnions 14 of the front toroidal speed change mechanism 2 and the trunnions 15 of the rear toroidal speed change mechanism 3 near the upper wall of the transmission case 1 are connected by an upper link 16. The upper link 16 is a plate member as shown in FIG. 3. Openings 16a where the upper ends of the trunnions 14, 15 are inserted and jointed are formed.

The lower ends of the trunnions 14 of the front toroidal speed change mechanism 2 and the trunnions 15 of the toroidal speed change mechanism 3 are also connected by a lower link 17. The lower link 17 is an identical plate member to the upper link 16 shown in FIG. 3. Openings 17a where the lower ends of the trunnions 14, 15 are inserted and jointed are also formed.

The upper ends and lower ends of the trunnions 14, 15 are jointed to the openings 16a and 17a of the links 16, 17 rotatably and free to pivot via combination joints each of which combine a spherical joint 18 and a bearing 19. The links 16, 17 restrict the displacement of the trunnions 14, 15 in the direction of the power roller rotation axis so that the power rollers 8, 9 are not pushed out from between the input/output disks even the power rollers 8, 9 receive a grip force from the input/output disks.

As shown in FIG. 1 and FIG. 2, between the upper ends of the trunnions 14, and between the upper ends of the trunnions 15, link supports 20, 21 are attached to the transmission case 1 by bolts 22, 23. Also, between the lower ends of the trunnions 14, and between the lower ends of the trunnions 15, link supports 24, 25 are attached to the transmission case 1 by bolts 26. Openings 16b for the link supports 20, 21 are formed in the link 16, as shown in FIG. 3. Identical openings 17b for the link supports 24, 25 are also formed in the link 17, as shown in FIGS. 1 and 2.

Figure 4:
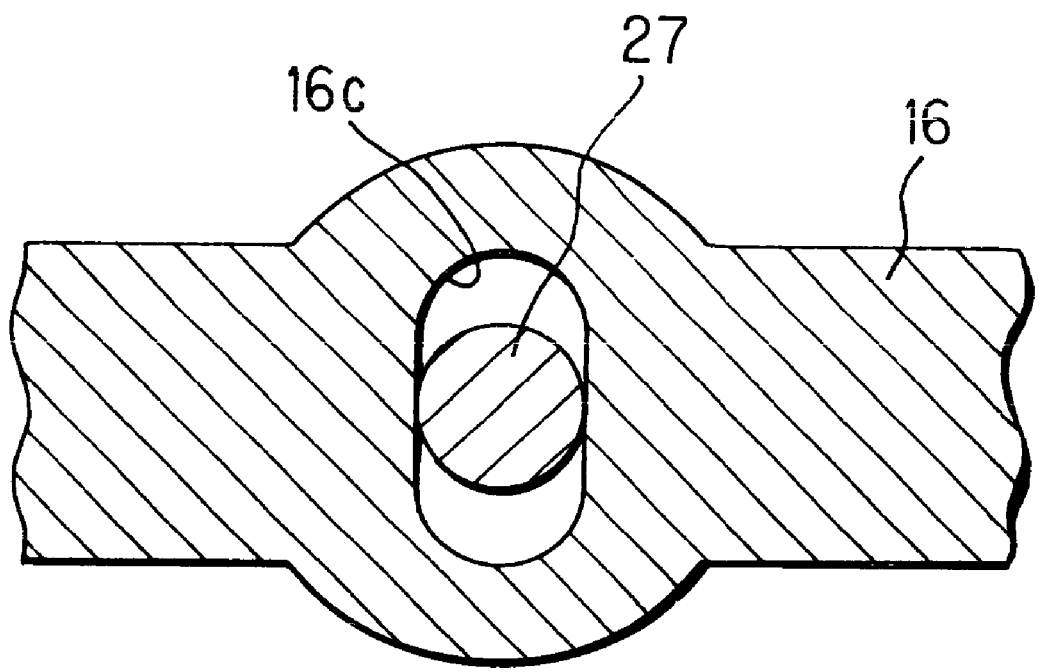
FIG. 4 is a sectional view taken through a line 4—4 of FIG. 3.

Pins 27 which project in the direction of the main shaft 10 are respectively provided on the link supports 20, 21, as shown in FIG. 1 to FIG. 3. Likewise, pins 28 are provided on the link supports 24, 25, as shown in FIGS. 1 and 2. The links 16, 17 are supported in the transmission case 1 by the pins 27, 28. Holes 16c, 17c penetrated by the pins 27, 28 are slots which lengthen in the trunnion axis $O_2$ direction, as shown in FIGS. 1, 2, and 4, and the links 16, 17 are supported free to displace in the trunnion axis $O_2$ direction.

Figure 5:
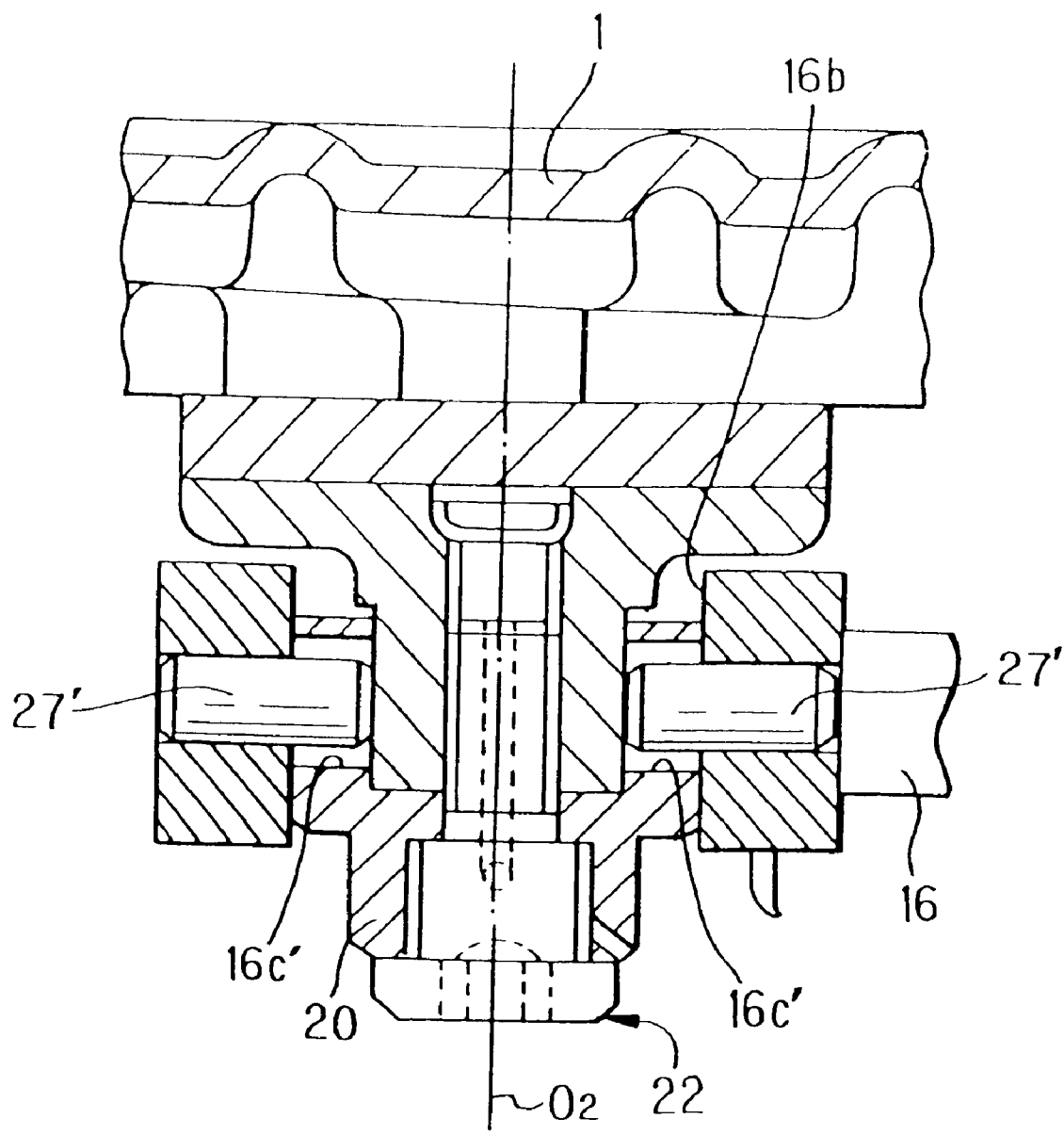
FIG. 5 is an enlargement showing another embodiment of the link support structure.

Unlike the embodiment shown, as shown in FIG. 5, by providing pins 27', 28' on the links 16, 17 and providing slots 16c', 17c' which lengthen in the trunnion axis $O_2$ direction in the link supports 20, 21, 24, 25, the links 16, 17 can be supported free to displace in the trunnion axis $O_2$ direction via the pins 27', 28' inserted into the slots 16c', 17c'.

Thus, the links 16, 17 are supported free to displace in the trunnion axis direction. However, if the links 16, 17 displace in the trunnion axis $O_2$ direction, and they interfere with components other than the trunnions 14, 15, the motion of the links 16, 17 and the trunnions 14, 15 will be hindered. To prevent the links 16, 17 from interfering with components other than the trunnions 14, 15, the displacement of the links 16, 17 in the trunnion axis $O_2$ direction is restricted by the trunnions 14, 15.

As shown in FIG. 2, the upper link 16 is sandwiched between step parts which support the spherical joints 18 and the bearings 19 formed at the upper ends of the trunnions 14, 15 (only step parts 14a of the trunnions 14 are shown in FIG. 2), and stopper plates 30 attached to the upper ends of the trunnions 14, 15 projecting from the openings 16a of the upper link 16 and attached by bolts 29 to the upper ends of the trunnions 14, 15. The displacement of the upper link 16 in the trunnion axis $O_2$ direction is thereby restricted. The diameter of the stopper plate 30 is made larger than the diameter of the opening 16a.

Likewise, as shown in FIG. 2, the lower link 17 is sandwiched between step parts which support the spherical joints 18 and the bearings 19 formed at the upper ends of the trunnions 14, 15 (only step parts 14b of the trunnions 14 are shown in FIG. 2), and pulleys 31 for a gyration synchronizing wire 46 provided at the lower ends of the trunnions 14, 15 projecting from the openings 17a of the lower link 17, and the displacement of the lower link 17 in the trunnion axis $O_2$ direction is thereby restricted. A gap is left between the links 16, 17, and the step parts, stopper plates 30 or pulleys 31 which sandwich them, to the extent that it does not interfere with the motion of the trunnions 14, 15 when the trunnions incline to the links 16, 17.

Here, the displacement of the links 16, 17 in the trunnion axis $O_2$ direction is restricted at all the joint parts at the four corners, but the displacement of the links 16, 17 in the trunnion axis $O_2$ direction can be restricted at least at the joint parts at two points on a diagonal.

A gear housing 32 is disposed between the output disks 6, 7 as shown in FIG. 1. The gear housing 32 is attached to the transmission case I by a bolt 33. An output gear 34 formed in one piece with the hollow output shaft 13 is stored in the gear housing 32. The gear housing 32 supports the main shaft 10 rotatably in the transmission case 1 via ball bearings 35 and the hollow output shaft 13. A counter gear 36 engages with the output gear 34, and the counter gear 36 is linked with a counter shaft 37.

A rotation input from the left-hand side of FIG. 1 is input to the input disks 4, 5 of the toroidal speed change mechanisms 2, 3 via a loading cam mechanism 38. The loading cam mechanism 38 is equipped with a cam flange 39, and is supported by the main shaft 10 rotatably via a radial thrust bearing 40. Cam rollers 41 are interposed between the input disk 4 and the cam flange 39. The loading cam mechanism 38 transmits an input rotation to the front input disks 4, 5, and applies a thrust force from the input disk 4 to the output disk 6 due to the relative rotation of the cam flange 39 and disk 4 produced according to the transmitted torque. The reaction force to the thrust force is then transmitted from the cam flange 39 to the rear input disk 5 via the radial thrust bearing 40, the main shaft 10 and the nut 12. It pushes the rear input disk 5 towards the rear output disk 7. Therefore, the power rollers 8, 9 are gripped by a force according to the transmitted torque between the input disks and output disks, and enable power transmission from the input disks to the output disks.

Servopistons 42 are further formed at the lower ends of the trunnions 14, 15, as shown in FIG. 2. The servopistons 42 are synchronously displaced in opposite directions by a control valve 43.

An input rotation is transmitted to the front input disk 4 via the loading cam mechanism 38, and the rotation transmitted to this input disk 4 is simultaneously transmitted also to the rear input disk 5 via the ball spline 11 and main shaft 10. The rotation of the input disks 4, 5 is transmitted to the power rollers 8, 9, and the power rollers 8, 9 rotate about the rotation axis $O_1$. The power rollers 8, 9 transmit a rotation to the output disks 6, 7, and this rotation is transmitted to the counter shaft 37 from the common output gear 34 to the counter shaft 37 via the counter gear 36.

The power rollers 8, 9 displace in synchronism in mutually opposite directions from the non-speed change positions shown in FIG. 1 and 2 in the direction of the trunnion axis $O_2$ via the trunnions 14, 15 by the servopistons 42. When the power roller rotation axis $O_1$ is shifted from the disk rotation axis $O_3$, the power rollers 8, 9 continuously gyrate around the trunnion axis $O_2$ as pivot. As a result, the contact circle radius between the power rollers 8, 9 and the input/output disks varies continuously, and the rotation speed ratio of the input disk 4 and output disk 6, and the rotation speed ratio of the input disk 5 and the output disk 7, can be made to vary continuously in synchronism.

The rotation speed ratio of the input disks 4, 5 and the output disks 6, 7 is the speed ratio of the transmission. If the power rollers 8, 9 are returned to their initial position when the speed ratio becomes a predetermined speed ratio, the speed ratio after speed change can be maintained.

In this embodiment, even if the trunnions 14, 15 and the links 16, 17 interfere in the joint parts during speed change, as the links 16, 17 are supported in the transmission case 1 free to displace in the trunnion axis direction via pins 27, 28, a force is not exerted on the trunnions 14, 15 by the links 16, 17. Hence, the forces acting on the power rollers 8, 9 by input/output disks are always maintained equal, and it does not occur that the forces acting on the power rollers 8, 9 differ which would cause one power roller to slip.

Therefore, it is unnecessary to increase the force with which the disks grip the power rollers in order to suppress slip of the power rollers, it is unnecessary to use a loading cam which generates a large thrust force, and the transmission can be made compact. Moreover, since reinforcement of parts is also suppressed, the transmission can be further miniaturized.

If the links are able to displace freely in the trunnion axis $O_2$ direction relative to the transmission case 1, the links 16, 17 interfere with components other than the trunnions 14, 15, and the motion of links 16, 17 may be hindered. If the motion of the links 16, 17 is hindered, in the joint parts of the trunnions 14, 15 and the links 16, 17, the trunnions 14, 15 will displace relative to the links 16, 17 in the trunnion axis $O_2$ direction. This relative displacement is performed against a large friction in the joint parts. Therefore, if the oil pressure to the servopistons 42 is not varied by a large amount to resist the above-mentioned large friction, it will be impossible to displace the trunnions 14, 15 in the trunnion axis direction and normal speed ratio control will no longer be possible. In the normal state, the trunnions 14, 15 can be displaced in the trunnion axis direction by slightly varying the oil pressure to the servopistons 42 from the aforesaid equilibrium state.

However, according to this embodiment, the displacement of the links 16, 17 in the trunnion axis $O_2$ direction is restricted by the trunnions 14, 15 via the stopper plates 30 and the pulleys 31 for the gyration synchronizing wire 46, so the links 16, 17 do not interfere with components other than the trunnions 14, 15 during speed change, motion is not hindered and a normal speed ratio control is assured.

In particular, the displacement in the trunnion axis $O_2$ direction of the upper link 16 is restricted by the step parts 14a formed in the upper ends of the trunnions 14, 15, and the stopper plates 30 attached to the upper ends of the trunnions 14, 15. Hence, the displacement of the upper link 16 in the trunnion axis $O_2$ direction can be controlled by a simple, economical construction merely by adding the stopper plates 30.

Moreover, the displacement of the lower link 17 in the trunnion axis $O_2$ direction is restricted by the step parts 14b formed in the lower ends of the trunnions 14, 15, and the pulleys 31 for the gyration synchronizing wire 46 attached to the lower ends of the trunnions 14, 15, so the displacement of the lower link 17 in the trunnion axis $O_2$ direction can be controlled by a simple, economical construction.

Figure 6:
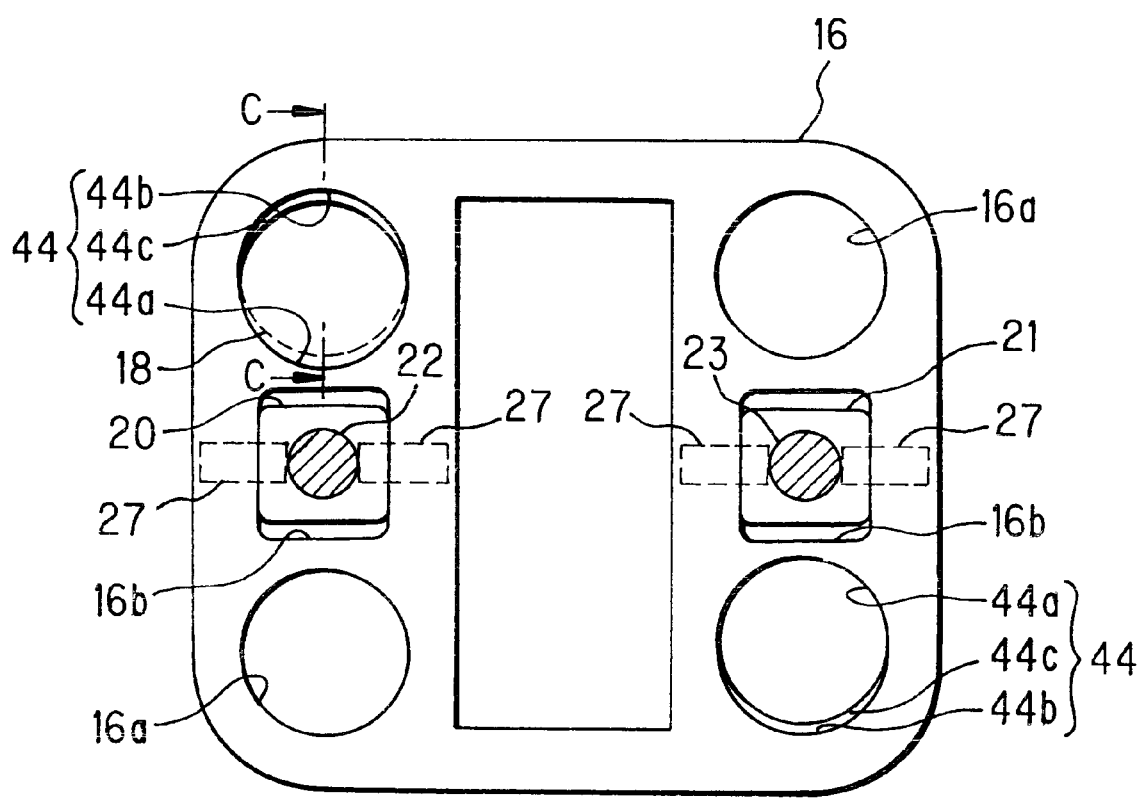
FIG. 6 is similar to FIG. 2, but showing a second embodiment of this invention.
Figure 7:
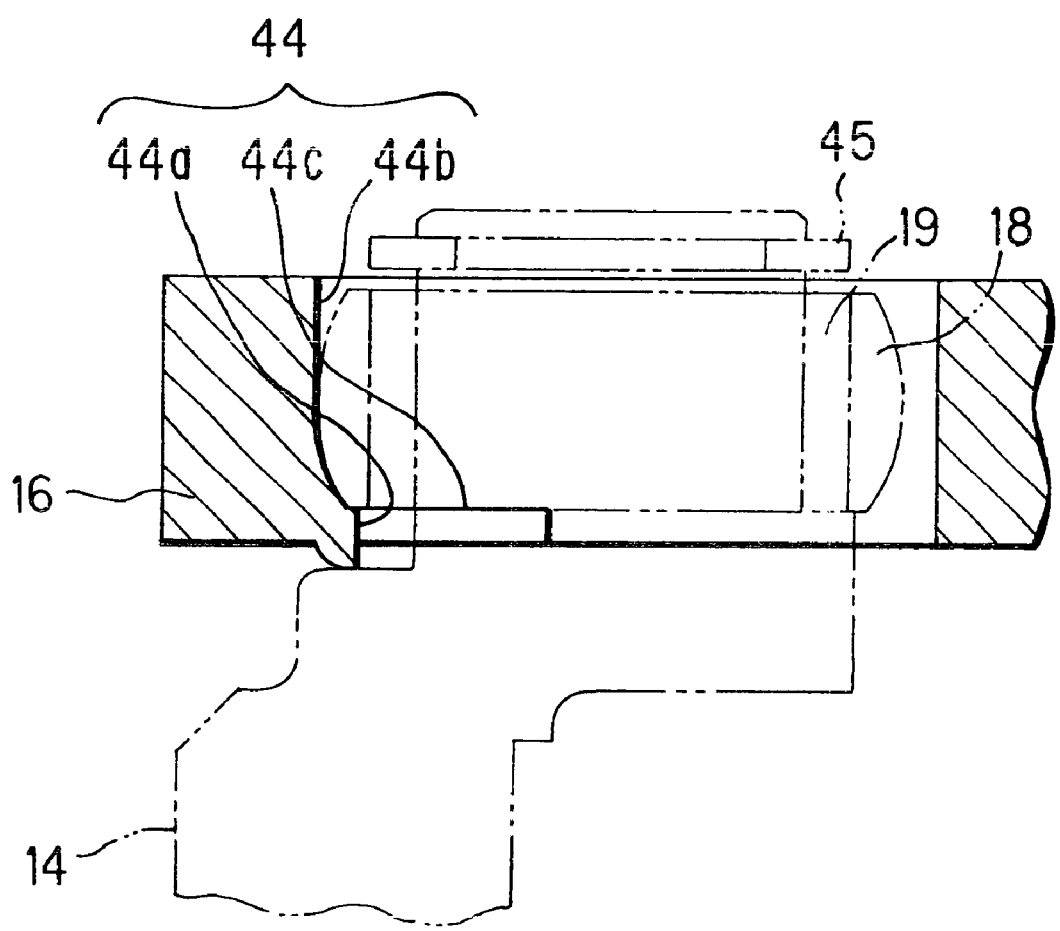
FIG. 7 shows the joint part of the upper link and a trunnion.

FIG. 6 and FIG. 7 show a second embodiment of this invention.

In the aforesaid embodiment, the displacement of the upper link in the trunnion axis $O_2$ direction is restricted by the stopper plates 30 attached to the upper ends of the trunnions 14, 15 by the bolts 29. However, in order to attach the stopper plates 30, first, the transmission case 1 is turned over so that the upper wall is turned downward, and the bolts 29 and the stopper plates 30 are dropped into the transmission case 1 from a base opening. Next, the upper link 16 is attached to the transmission case 1, but a tool must be inserted from openings 1a (FIG. 2) of the upper wall of a transmission case 1 and the bolts 29 must be tightened in the state where the upper ends of the trunnions 14, 15 are joined to the openings 16a at the four corners (FIG. 3) of the link 16. Thus, the operation of attaching the stopper plates 30 is troublesome and inefficient.

Hence, in the second embodiment shown in FIG. 6 and FIG. 7, without using a stopper plates 30, the upper link 16 itself is improved so that the displacement in the trunnion axis $O_2$ direction, i.e., the direction away from the trunnions, is restricted without using the stopper plates 30.

Specifically, of the four holes provided at the four corners of the upper link 16 into which the combination joints are inserted, the pair of holes 16a on one diagonal line are circular holes, whereas holes 44 on the other diagonal line are oblong (correctly, the center of the trace obtained when a circle is moved in a straight line, hereafter idem) having a step part, as shown in FIG. 6.

Lower openings 44a of the holes 44 into which combination joints 18, 19 stopped by a snap ring 45 at the upper ends of the trunnions 14, 15 are inserted, are circular, and upper openings 44b are oblong so that the combination joints 18, 19 so fitted can displace away from the main shaft $O_3$ (up/down direction in FIG. 6), as shown in FIG. 7. A seat 44c on which the power roller end faces of the combination joints 18, 19 are seated, is formed on the rim of the lower opening of the hole 44. The hole 44 is arranged so that the upper opening 44b is aligned with the hole 16a in the direction of the main shaft $O_3$.

When the upper ends of the trunnions 14, 15 are joined to the holes 44, the combination joints 18, 19 stopped by the snap ring 45 at the upper ends of the trunnions 14, 15 are first inserted from the lower opening 44a of the holes 44 of the upper link 16 attached in the upper wall of the transmission case 1, and are made to reach the upper opening 44b.

The combination joints 18, 19 are then displaced in the direction away from the main shaft $O_3$ (up/down direction in FIG. 6), as shown in FIG. 7, and the lower ends of the combination joints 18, 19 are seated on the seat 44c.

Due to the above procedure, the upper ends of the trunnions 14, 15 are joined to the holes 44 of the upper link 16 via the combination joints 18, 19. The displacement of the upper link 16 in the trunnion axis O₂ direction away from the trunnion is restricted by the seat 44c.

Therefore, the displacement of the upper link 16 in the trunnion axis O₂ direction in the direction away from the trunnion, can be restricted by a simple, economic construction wherein the holes 44 of the upper link 16 are formed as the aforesaid oblong with a step. Hence, the entire operation of connecting the upper ends of the trunnions 14, 15 to the upper link 16 can thus be easily performed from the base opening of the transmission case 1, and there is no need to provide the openings 1 a (FIG. 2) for carrying out work on the upper wall of the transmission case 1.

In addition, if the upper ends of the trunnions 14, 15 are joined to the pair of holes 44 as mentioned above on a diagonal line, the displacement of the upper link 16 in the trunnion axis direction in the direction away from the trunnions 14, 15, can be restricted not only in these joint parts, but also in the other joint parts of the upper ends of the trunnions 14, 15 at the pair of holes 16a shown in FIG. 6. There is no need to provide the seat 44c to the joint parts at the holes 16a. Therefore, the displacement of the upper link 16 in the trunnion axis direction can be effectively limited to the absolute minimum.

The entire contents of Japanese Patent Application P11-372451 (filed Dec. 28, 1999) are incorporated herein by reference.

Although the invention has been described above by reference to a certain embodiment of the invention, the invention is not limited to the embodiment described above. Modifications and variations of the embodiments described above will occur to those skilled in the art, in light of the above teachings. The scope of the invention is defined with reference to the following claims.

What is claimed is:

1. A toroidal continuously variable transmission, comprising:
    an input disk;
    an output disk facing the input disk;
    power rollers gripped between the input disk and output disk;
    trunnions which support the power rollers rotatably; and
    a link jointed to the trunnions, which limits the displacement of the trunnions in the power roller rotation axis direction, and is supported free to displace in the trunnion axis direction in a transmission case,
    wherein one of the trunnions has a stopper member which restricts the displacement of the link in the trunnion axis direction away from the trunnions, and
    wherein the stopper member is a stopper plate attached to the upper end of the trunnion.

2. A toroidal continuously variable transmission as defined in claim 1, wherein the link is supported by a link support attached to the transmission case.

3. A toroidal continuously variable transmission as defined in claim 1, wherein one of the trunnions has a step part which restricts the displacement of the link in a direction approaching the trunnions.

4. A toroidal continuously variable transmission as defined in claim 1, wherein one of the trunnions has a pulley for a gyration synchronizing wire and the pulley restricts the displacement of the link in the trunnion axis direction away from the trunnions.

5. A toroidal continuously variable transmission as defined in claim 1, wherein the link is supported by a link support attached to the transmission case, and wherein the link support has a slot which lengthens in the trunnion axis direction, the link has a pin inserted into the slot and the link is supported by the link support via the pin.

6. A toroidal continuously variable transmission as defined in claim 1, wherein the link is supported by a link support attached to the transmission case, and
    wherein the link has a slot which lengthens in the trunnion axis direction, the link support has a pin inserted into the slot and the link is supported by the link support via the pin.

7. A toroidal continuously variable transmission, comprising:
    an input disk;
    an output disk facing the input disk;
    power rollers gripped between the input disk and output disk;
    trunnions which support the power rollers rotatably; and
    a link jointed to the trunnions, which limits the displacement of the trunnions in the power roller rotation axis direction, and is supported free to displace in the trunnion axis direction in a transmission case,
    wherein the link is supported by a link support attached to the transmission case; and
    wherein the link support has a slot which lengthens in the trunnion axis direction, the link has a pin inserted into the slot and the link is supported by the link support via the pin.

8. A toroidal continuously variable transmission, comprising:
    an input disk;
    an output disk facing the input disk;
    power rollers gripped between the input disk and output disk;
    trunnions which support the power rollers rotatably; and
    a link jointed to the trunnions, which limits the displacement of the trunnions in the power roller rotation axis direction, and is supported free to displace in the trunnion axis direction in a transmission case,
    wherein the link is supported by a link support attached to the transmission case; and
    wherein the link has a slot which lengthens in the trunnion axis direction, the link support has a pin inserted into the slot and the link is supported by the link support via the pin.

9. A toroidal continuously variable transmission, comprising:
    an input disk;
    an output disk facing the input disk;
    power rollers gripped between the input disk and output disk;
    trunnions which support the power rollers rotatably; and
    a link jointed to the trunnions, which limits the displacement of the trunnions in the power roller rotation axis direction, and is supported free to displace in the trunnion axis direction in a transmission case,
    wherein:
        the link and one of the trunnions are jointed via a joint,
        the link is provided with a seat on which the joint is seated, and
        the seat restricts the displacement of the link in the trunnion axis direction away from the trunnions.

* * * * *